United States Patent [19]

Mayumi et al.

[11] Patent Number: 4,827,167
[45] Date of Patent: May 2, 1989

[54] MINIATURE MOTOR

[75] Inventors: Etuo Mayumi; Hitoshi Fujiwara; Kunio Hiromasa; Kazuo Okada, all of Matsudo, Japan

[73] Assignee: Mabuchi Motor Co., Ltd., Japan

[21] Appl. No.: 160,692

[22] Filed: Feb. 26, 1988

[30] Foreign Application Priority Data

Feb. 27, 1987 [JP] Japan .............................. 62-28172[U]

[51] Int. Cl.⁴ ................................................ H02K 5/00
[52] U.S. Cl. ................................ 310/89; 310/40 MM; 310/42; 174/52.1; 220/352
[58] Field of Search ............ 310/40 MM, 89, 90, 91, 310/51, 258, 42, DIG. 6, 85, 88; 384/903; 220/352, 353, 354; 174/52 R

[56] References Cited

U.S. PATENT DOCUMENTS

| 2,701,318 | 2/1955 | Feiertag | 310/258 |
| 4,076,989 | 2/1978 | Watson | 310/89 |
| 4,086,510 | 4/1978 | Watanabe | 310/89 |
| 4,213,660 | 7/1980 | Yasui | 384/903 |
| 4,504,009 | 3/1985 | Boik | 220/352 |

FOREIGN PATENT DOCUMENTS

| 0188801 | 7/1986 | European Pat. Off. | 310/40 MM |
| 2806116 | 8/1979 | Fed. Rep. of Germany | 310/89 |

*Primary Examiner*—R. Skudy
*Attorney, Agent, or Firm*—McGlew and Tuttle

[57] ABSTRACT

A miniature motor having installed motor components in a housing made of a metallic material and formed into a bottomed, hollow cylindrical shape with an opening at one end thereof; a cover made of a metallic material and formed into a plate shape being fixedly fitted to the opening, in which a plurality of minute ridges are provided on the outside circumferential surface of the cover, and the outside dimensions of the cover are made equal to, or slightly larger than, the inside dimensions of the housing opening so as to ensure a firm press-fit between the cover and the housing opening, thereby maintaining electrical contact between both.

7 Claims, 1 Drawing Sheet

MINIATURE MOTOR

BACKGROUND OF THE INVENTION

This invention relates generally to a miniature motor for use as a drive unit in tape recorders and other audio equipment, and more particularly to a miniature motor adapted to prevent the electrical noise caused by commutating sparks from leaking to the outside of the motor.

DESCRIPTION OF THE PRIOR ART

Miniature motors of the conventional type generally have a construction as shown in a longitudinal section of the essential part of the motor of FIG. 3. In the figure, numeral 1 indicates a housing made of an electrically conductive metallic material and formed into a bottomed, hollow cylindrical shape with an opening at one end thereof. In the housing 1 installed are a stator 2 and a rotor 3, and a cover 4 made of an electrically conductive material and formed into a disc shape is fixedly fitted to the opening to close the open end of the housing. Numeral 5 refers to a brush, which is provided on the cover 4 and brought into sliding contact with a commutator 7. Numeral 6 refers to an insulating The miniature motor of the conventional type involves a problem of the electrical noise caused by the commutating sparks generated during sliding contact between the brushes 5 and the commutator and leaking to the outside of the motor. This is because the cover 4 is simply engaged with the open end face of the housing 1, and this leads to insufficient electrical contact between both. To ensure positive electrical contact between the housing 1 and the cover 4, therefore, various means of increasing the axial contact length between the housing 1 and the cover 4 have been conceived, which include increasing the thickness of the cover 4 and employing draw forming. These means, however, involve increased material consumption, increased motor weight, increased manufacturing costs due to the increase in fabricating steps.

SUMMARY OF THE INVENTION

It is an object of this invention to provide a miniature motor which solves the problems associated with the prior art, and has an excellent function to prevent electrical noise from leaking with a simple construction.

It is another object of this invention to provide a miniature motor which not only prevents electrical noise from leaking but also enhances the joining strength between the cover and the housing.

To overcome the aforementioned problems associated with the prior art, this invention, whifh is concerned with a miniature motor having installed a motor assembly in a housing made of a metallic material and formed into a bottomed, hollow cylindrical shape with an opening at one end thereof, and having fixedly fitted to the opening a cover made of a metallic material and formed into a disc shape, employs a technical means in which a plurality of minute ridges are provided on the outside circumferential surface of the cover, and the outside dimensions of the cover are made equal to, or slightly larger than, the inside dimensions of the housing opening to ensure a firm pressure-fit, thus maintaining electrical contact between both.

With the abovementioned arrangement, the minute ridges provided on the outside circumferential surface of the cover cut into the inside circumferential surface of the housing at the press-fit portion between the housing and the cover, ensuring a positive electrical contact between both.

DETAILED DESCRIPTION OF THE PREFERRED EMBODIMENT

Figure 1:
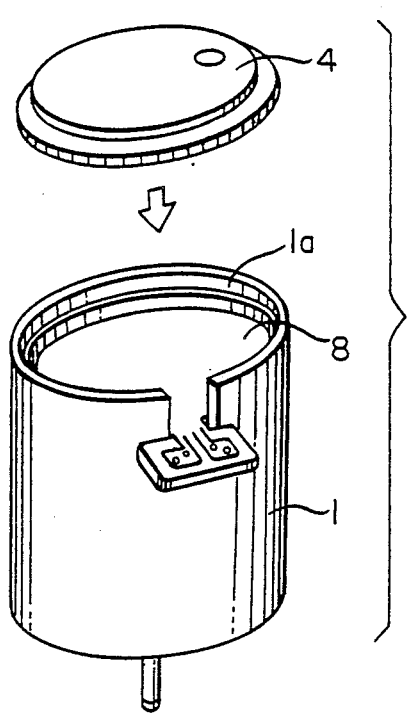
FIG. 1 is a perspective view of the essential part of an embodiment of this invention.

FIG. 1 is a perspective view of an embodiment of this invention. In the figure, like parts are indicated by the same reference numerals shown in FIG. 3. FIG. 1 shows the state where all components but the cover 4 have been installed in the housing 1. In FIG. 1, a plurality of minute, rigid ridges 4a are provided on the outside circumferential surface of the cover, as is more clearly seen in the partially enlarged view of FIG. 2. The outside dimensions, or outside diameter, of the cover 4 are made at least equal to, or slightly larger than (substantially equal to), the inside circumferential dimensions, or outside diameter, of the opening 1a formerly the inside surface of the housing 1. Numeral 8 refers to a motor control circuit board.

Figure 2:
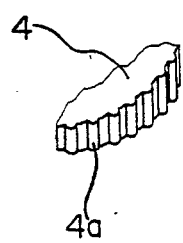
FIG. 2 is an enlarged perspective view showing details of the cover shown in FIG. 1.
Figure 3:
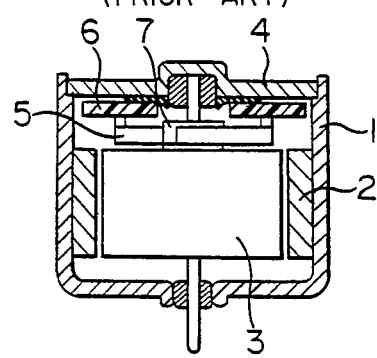
FIG. 3 is a longitudinal section of the essential part of a miniature motor of a conventional type.

When the housing 1 and the cover 4 are constructed in the abovementioned fashion, and the cover 4 is fitted to the opening 1a of the housing 1, as shown by an arrow in FIG. 1, and press-fitted by a press or any other press-fitting means, the minute ridges 4a shown in FIG. 2 cut into the inside circumferential surface of the opening 1a of the housing 1. Thus, as the cover 4 is press-fitted to the housing 1, electrical contact between both can be positively accomplished over the entire circumference.

In this embodiment, the minute ridges, which are of a cog, or knurl shape, or a shape of the milled edge of a coin, are continuously provided over the entire outside circumferential surface of the cover 4. Substantially the same effect, however, can be achieved by providing these ridges intermittently or in a distributed fashion over the entire circumference. The shape and press-fit allowance of the minute ridges can be selected appropriately taking into consideration the hardness and other mechanical properties of the metallic materials of the cover and housing.

It is of course necessary to maintain the axial length enough to receive the cover on the opening of the housing to which the cover is fitted. However, the housing and the cover can be fitted more firmly by forming the edge of the housing in such a manner as to slightly protrude from the upper surface of the cover after the cover is fitted to the housing, and staking partly or entirely the edge of the housing to ensure a firm grip between both. Furthermore, this embodiment describes a miniature motor having no other motor components on the cover, but the same effect can also be expected in a miniature motor in which bearings and other motor components are provided integrally with the cover.

The cross-sectional shape of the housing and the planar shape of the cover are not limited to a circular shape, but may be of a polygonal shape. Moreover, electrical noise can also be prevented even in a construction where the entire motor is enveloped in a hollow cylindrical case and a plate-shaped cover, both made of a shielding material, such as aluminum or an aluminum alloy, for example. That is, the abovementioned housing may be either a motor case that is in close contact with the stator 2, or a shield case provided over the motor case in such a manner as to envelop the motor case. The shield case used here has almost the same shape as the motor case.

With this invention having the aforementioned construction and operation, the following effects can be expected.

(1) The thickness of the metallic material of which the cover is made can be reduced, and the axial size of the motor can also be reduced because no drawing operation is needed. This results in a saving in material cost and a compact motor size.

(2) The minute ridges provided on the edge of the cover can be formed simultaneously with the forming of the cover, leading to improved machining accuracy.

(3) Since the minute ridges provided on the edge of the cover slightly cut into the inside circumferential surface of the housing, electrical contact between the housing and the cover can be maintained even if a plating film, oxidized film, foreign matter or any other electrically non-conductive substance adheres to the inside circumferential surface of the housing. Thus, variations in characteristics can be substantially reduced, and quality can be materially improved.

(4) In connection with (3) above, process control and production control can be facilitated, and productivity can be improved since there is no need for a cleaning process to remove the aforementioned electrically non-conductive substances.

What is claimed is:

1. A miniature motor having installed motor components in a housing made of a metallic material and formed into a bottomed, hollow cylindrical shape with an opening at one end thereof; a cover made of a metallic material and formed into a plate shape being fixedly fitted to said opening, characterized in that a plurality of minute ridges are provided on the outside circumferential surface of said cover and extend radially outwardly from said surface, and the outside dimensions of said cover are made equal to, or slightly larger than, the inside circumferential dimensions of said opening of said housing so that radially outer ends of the ridges engage the axially extending inside surface of the housing adjacent the opening with a cutting action thereby to press-fit said cover to said opening so as to ensure electrical contact between both.

2. A miniature motor as claimed in claim (1) wherein said minute ridges are provided continuously over the entire outside circumferential surface of said cover.

3. A miniature motor as claimed in claim 1 wherein said minute ridges are a selected one of a cog, knurl shape, and a shape of a milled edge of a coin.

4. A miniature motor as claimed in claim (1) wherein said cover is fitted to said housing in such a manner that the edge of said housing protrudes from the upper surface of said cover, and staked so that at least part of the edge of said housing is pressed into said cover.

5. A miniature motor as claimed in claim (1) wherein said housing is a motor case.

6. A miniature motor as claimed in claim 1 wherein said ridges are minute ridges.

7. A miniature motor having installed motor components in a housing made of a metallic material and formed into a bottomed, hollow cylindrical shape with an opening at one end thereof; a cover made of a metallic material and formed into a plate shape being fixedly fitted to said opening of said housing characterized in that a plurality of minute, rigid ridges are provided in spaced apart circumferential relation on the outside circumferential surface of a planar portion of said cover and extend radially outwardly from said surface, and the outside dimensions of said cover are made equal to, or slightly larger than, the inside circumferential dimensions of said opening so that radially outer ends of the ridges engage the axially extending inside surface of the housing adjacent the opening with a cutting action thereby to press-fit said cover to said opening so as to ensure electrical contact between both.

* * * * *